May 24, 1966 V. A. JUENGEL 3,252,563
CONVEYOR APPARATUS
Filed Aug. 30, 1963 4 Sheets-Sheet 2
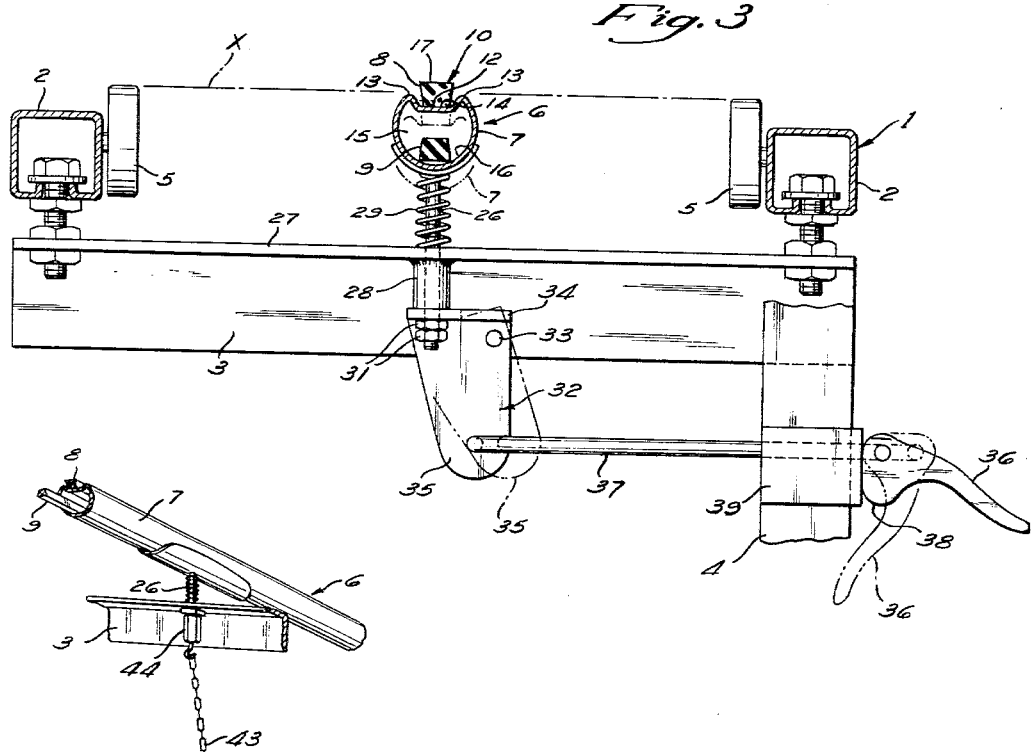
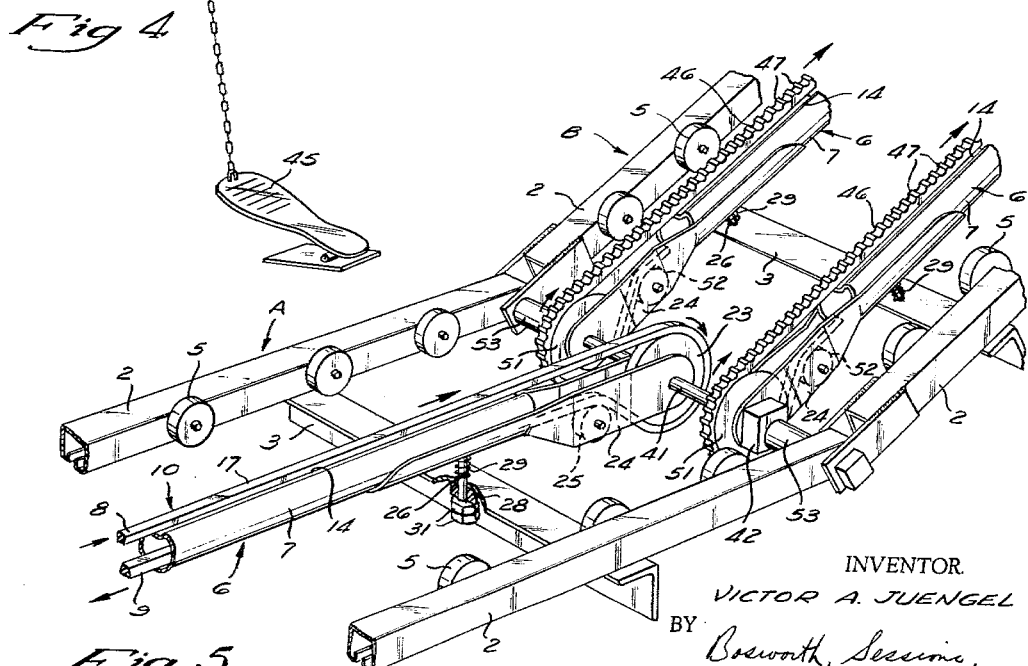
INVENTOR.
VICTOR A. JUENGEL
BY Bosworth, Sessions,
Herrstrom & Knowbe
ATTORNEYS

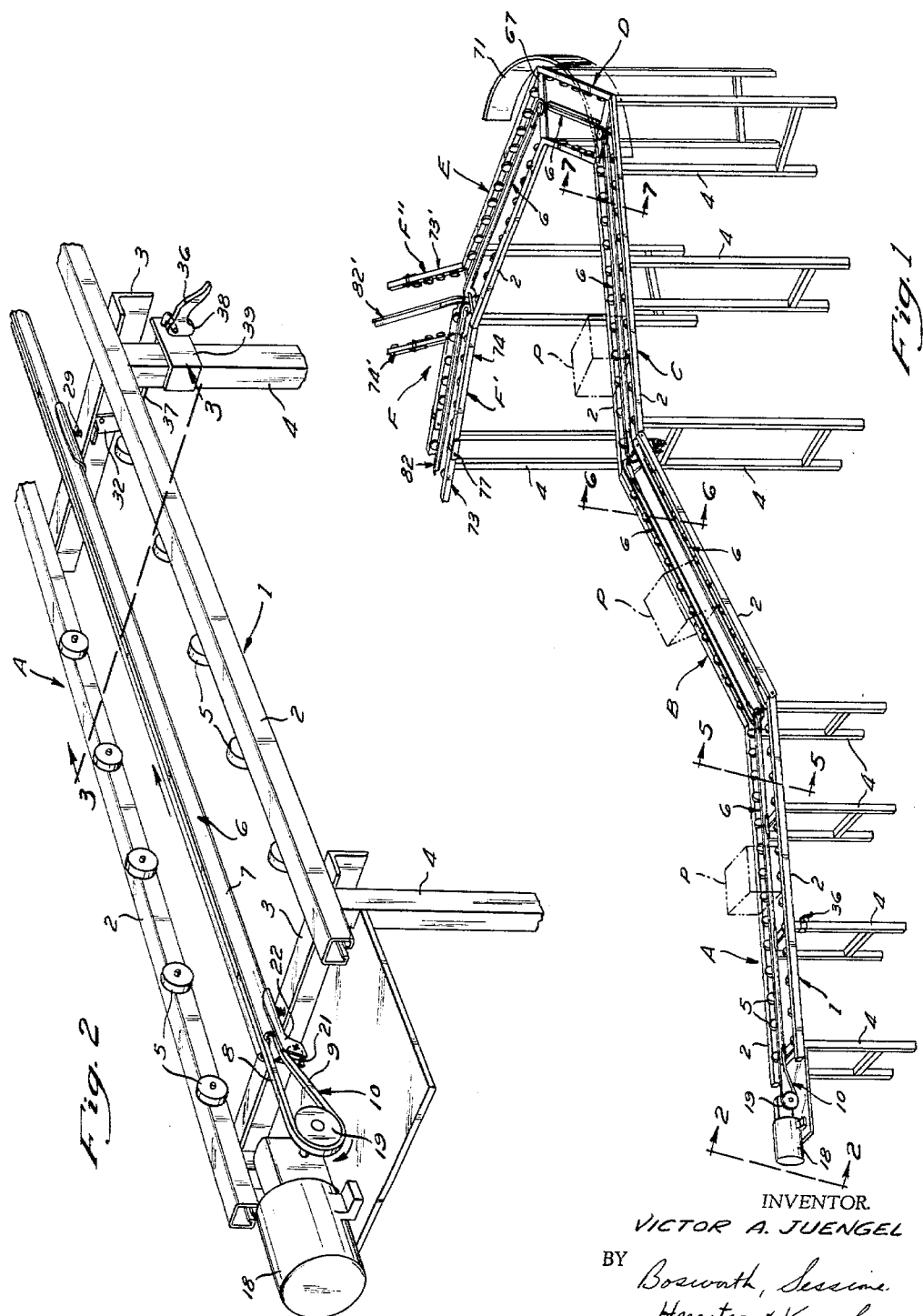

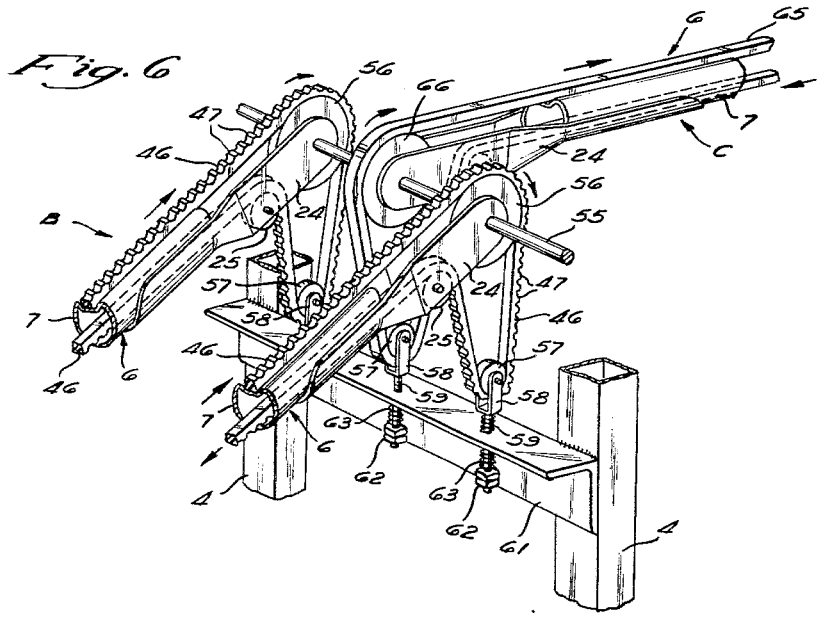
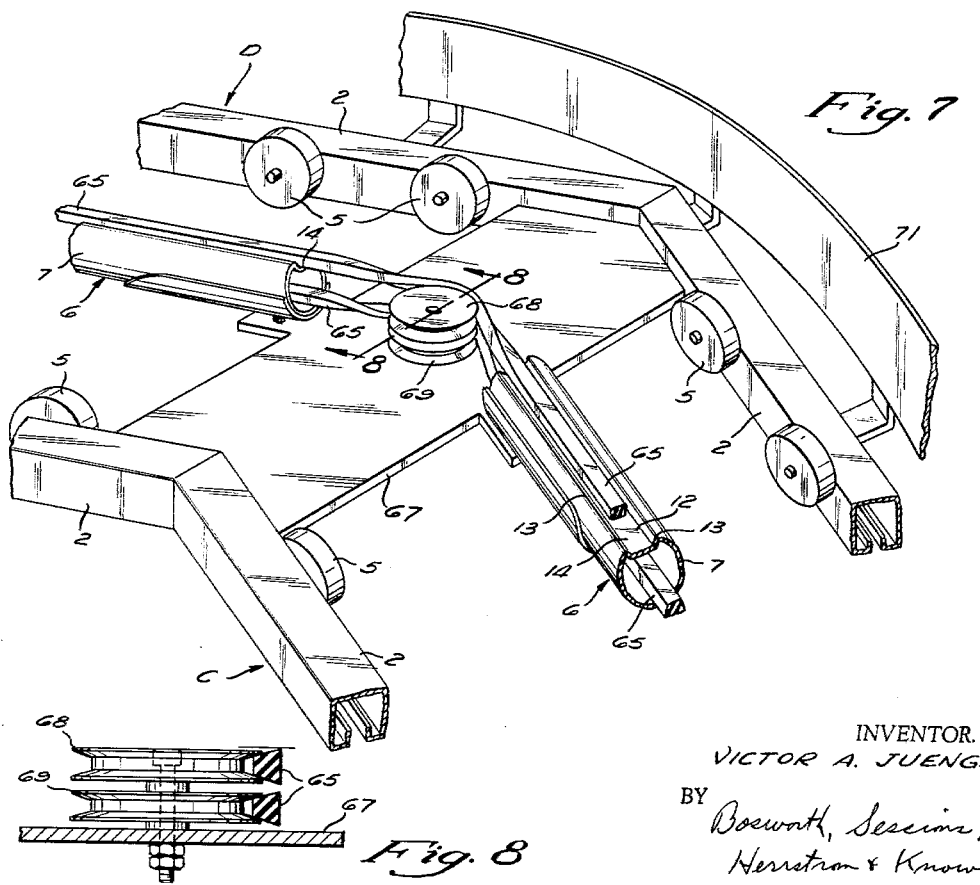
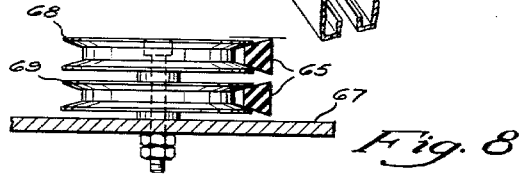

May 24, 1966  V. A. JUENGEL  3,252,563
CONVEYOR APPARATUS
Filed Aug. 30, 1963  4 Sheets-Sheet 4
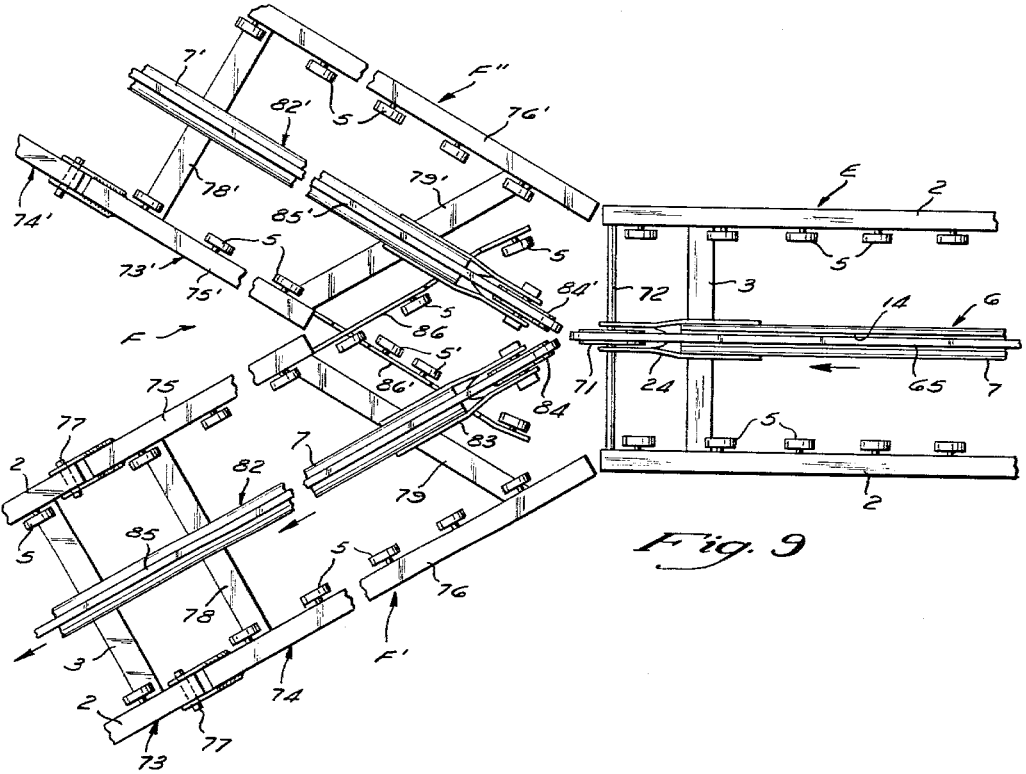
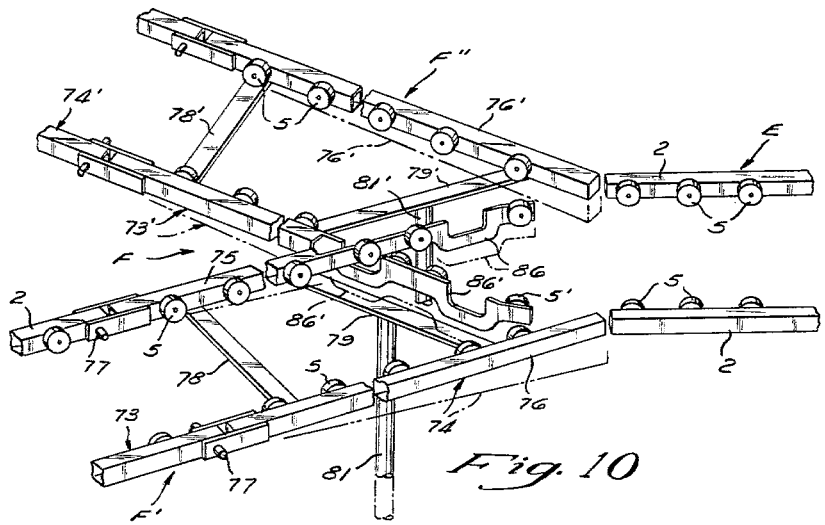
INVENTOR.
VICTOR A. JUENGEL
BY Bosworth, Sessions,
Herndon & Knowles
ATTORNEYS United States Patent Office 3,252,563
Patented May 24, 1966

3,252,563
CONVEYOR APPARATUS
Victor A. Juengel, 421 Oakland Road, Helena, Ark.
Filed Aug. 30, 1963, Ser. No. 305,731
10 Claims. (Cl. 198—82)

This invention relates to conveyor apparatus, and more particularly to conveyor apparatus of the general type embodying driving means having adjacent article-supporting rotatable members.

There are increasing needs for conveyors of this type, particularly in automatic conveyorized systems. One form of typical prior conveyor comprises rotatable rollers that are supported from the frame to engage the side portions of the bottom of the article being conveyed, and, between the rollers, a belt that frictionally engages the underside of the article to drive the article along the conveyor on the rollers. The upper run of this belt is supported by a large number of relatively closely spaced rotatable supporting rollers, while the lower belt run is supported by widely spaced rotatable rollers. The upper run of the belt is urged upwardly to engage the underside of the article being conveyed when it is desired to move the article, and is disengaged from the article when it is desired that the article halt.

While such prior conveyors are widely used, in general they have undesirable features. They are undesirably complicated and expensive due to the numerous rollers needed for supporting the upper run of the belt and the complicated mechanism needed for moving the upper belt run toward and away from the article being conveyed. The belt can be soiled by contaminants to which the lower run of the belt is exposed; the belt can also be soiled by rollers supporting it, particularly if they are lubricated to reduce power requirements. Furthermore, complications develop when it is desired to move articles upwardly at substantial angles of inclination, since the frictional forces which may be satisfactory to move articles along horizontal runs of the conveyor may not be sufficient for steep angles of inclination. Moreover, direction-changing switches employing prior conveyor structures are complicated, expensive, and usually require considerable maintenance.

It is an object of the present invention to provide conveyor apparatus of the general type indicated above which is free of such disadvantages. Another object is the provision of conveyor apparatus of such type which may be built at a relatively low cost, and which is simple and effective in construction and operation, and requires little maintenance.

These and other objects of the invention will be apparent from the following description of a preferred embodiment in connection with the following drawings, in which:

FIGURE 1 is a perspective view showing a conveyor system embodying the invention, comprising two horizontal sections at different levels joined by an inclined section, sections providing a change in direction in the horizontal plane, and a switching section permitting articles to be switched to two different tracks in a generally horizontal plane;

FIGURE 2 is a perspective view to an enlarged scale, as viewed from line 2—2 of FIGURE 1 of the horizontal section of the conveyor, showing power means for driving the conveyor and also means for raising and lowering the driving element;

FIGURE 3 is a cross section to a still larger scale, generally from line 3—3 of FIGURE 2;

FIGURE 4 is a perspective diagrammatically illustrating another means for lowering the driving element of the conveyor to disengage it from the package;

FIGURE 5 is a perspective, to an enlarged scale, generally viewed from line 5—5 of FIGURE 1, showing how the inclined section of the conveyor can be provided with a plurality of driving belts for increased friction, and how such belts can be driven;

FIGURE 6 is a detail, generally viewed from line 6—6 of FIGURE 1, showing means for maintaining tension in the belts of adjacent sections;

FIGURE 7 is a perspective, generally viewed from line 7—7 of FIGURE 1, but to an enlarged scale, showing the arrangement of parts at two sections forming an angle in a generally horizontal plane;

FIGURE 8 is a detail to an enlarged scale, along line 8—8 of FIGURE 7, showing the upper and lower runs of the belt passing over a direction-changing pulley;

FIGURE 9 is a plan elevation, generally from line 9—9 of FIGURE 1, showing a switch; and FIGURE 10 is a perspective showing how sections of the conveyor in the switch can be moved downwardly to permit switching, the driving belts being omitted for the sake of clearness in the drawing.

The conveyor apparatus of FIGURE 1 is intended to illustrate various types of structures that may be used in a conveyor system embodying the invention, but the invention is not limited to the particular arrangement shown. The illustrated apparatus comprises a horizontal section A at a lower level, an inclined section B extending from such lower level to an upper level, another horizontal section C at the higher level, a generally horizontal section D at said level inclined in a substantially horizontal plane at an angle of substantially 45° to section C, another generally horizontal section E at the same level as sections C and D but inclined in a generally horizontal plane at an angle of 45° to section D to form an angle of substantially 90° with section C, and a switching section F having two sections F' and F", each of which lies substantially in the same horizontal plane as sections C, D and E.

Horizontal section A, as shown in FIGURES 1 and 2, comprises a rigid frame 1 made up of generally parallel horizontal side rails 2 rigidly fixed to cross members 3 which are rigidly connected to and supported by spaced generally parallel vertical legs 4. Each side rail member 2 carries freely rotatable rollers, as the wheels 5 in the illustrated embodiment, which may be of known construction and conventionally mounted on anti-friction bearings, not shown. Wheels 5 are spaced along each rail at such intervals and in such relation to the wheels on the other rail member that they can support and move along the conveyor articles such as packages P within the range of sizes and weights for which the conveyor is designed. The wheels 5 are mounted so that their upper surfaces project above the tops of the rails 2 sufficiently to permit the articles P to be carried free of the rails.

The driving means includes a drive unit 6 located between the wheels for engaging and moving the articles carried by the wheels longitudinally of the conveyor. Unit 6 comprises a rigid tubular carrier member 7 that slidably supports and guides the upper and lower runs 8 and 9 of an endless belt 10. The exterior of the upper portion of the illustrated carrier member is shaped to support and guide the upper run 8 of the belt so it can travel longitudinally along the carrier member in the direction of travel of the article conveyed. As shown in FIGURES 2 and 3, this portion of the carrier member has a flat smooth belt-supporting surface 12 and a raised belt-guiding shoulder 13 at each longitudinal edge of surface 12 to define a shallow channel 14 in which the upper run of the belt travels.

The lower or return run 9 of the belt travels inside the carrier member 7 through opening 15 extending longitudinally through the carrier member below its upper channel-shaped wall portion, the lower belt run being slidably supported by the channel 16 defined by the lower wall portion of the carrier member. The lower belt run 9 thus travels in a guided, enclosed path longitudinally of the carrier member in the direction opposite to the direction of travel of the upper run 10. The carrier member 7 preferably is a seamless tube the wall of which is shaped to form the belt-carrying channels.

Belt 10 preferably is a rubber V-belt of trapezoidal cross sections and of conventional reinforced construction. It travels with its narrower edge down in the upper run so its wider edge engages the article being conveyed, and with its wider edge in sliding engagement on the lower run.

The thickness of the belt 10, and the cross sectional size and shape of the carrier member 7, are such as to permit the upper surface 17 of the upper run 8 of the belt to project substantially above the uppermost portions 13 of the carrier to member 7, so it can contact the underside of the article supported by the wheels of the conveyor when the driving means is raised to engage the article.

Carrier member 7 preferably is made of as many shorter lengths as are required to produce the desired total length of conveyor section, all of these shorter lengths being of identical cross section and preferably located end to end and aligned to provide smooth slidable supports for the runs of belt 10.

Belt 10 is positively driven from one end of carrier member 7 by a suitable source of power. That for section A, as shown in FIGURES 1 and 2, comprises an electric motor 18 driving a grooved pulley around which the belt passes, and a grooved idler pulley 21 rotatably journalled in a bracket 22 fixed to the underside of carrier member 7. The axes of the pulleys 19 and 21 are substantially horizontal and located below the upper belt-supporting surface 12 of carrier member 7 so that the top of driving pulley 19 carries and guides the upper run of the belt to the carrier member, and the top of the idler pulley 21 engages and guides the lower run of the belt as it leaves the carrier member, while increasing the belt wrap on the driving pulley and protecting the lower belt run from scraping as it leaves the carrier member.

At the other end of the carrier member (FIGURE 5) the belt 10 passes around a grooved pulley 23 journalled in a bracket 24 fixed to the carrier member, and over a grooved pulley 25 also journalled in bracket 24 to prevent the lower run of the belt from scraping as it enters carrier member 7 and to increase belt wrap on the pulley 23 when it is used for driving purposes as later described.

In Section A of the illustrated conveyor, the tubular carrier member 7 is mounted on cross members 3 of the frame of section A of the conveyor so it is resiliently urged upwardly to cause the top surface 17 of the upper run 8 of belt 10 to engage the undersides of articles P carried by the conveyor when it is desired to propel the articles on the conveyor, and so it can be withdrawn downwardly to cause the upper run of the belt to disengage from the articles when it is desired to cease propelling them. To accomplish this, as shown in FIGURE 3, the underside of the tubular carrier member 7 rigidly carries several spaced downwardly extending studs 26, each of which extends through a flange 27 of one of the cross members 3 of the frame, being prevented from tilting relatively to member 3 by an extension sleeve 28 fixed to the underside of the flange. A compression-type spring 29 surrounds each stud 26, bearing between the upper surface of the cross member 3 and the underside of the carrier member 7. These springs 29 resiliently upwardly urge the carrier member 7 and belt 10 carried by it.

The means shown in FIGURES 1, 2 and 3 for pulling the carrier member 7 downwardly to disengage its belt 10 from the articles being conveyed may be associated with one, several, or all of the studs 26 supporting a carrier member 7. As shown in FIGURE 3, it comprises lock nuts 31 threaded on the end of the stud 26 projecting through the cross member 3 and acting as stop means, an actuating member 32 pivotally mounted at 33 on the cross member 3 and having a flange 34 through which the stud 26 projects and which bears against the lock nuts 31 and also having a depending lever portion 35, a handle 36 pivotally mounted on the frame of the apparatus, and a tie rod 37 connecting the handle 36 to the lever portion 34 of the pull-down member 32. These parts are so proportioned that when handle 36 is in one extreme position, shown in full lines, they cause the actuating member 32 to be in its uppermost position, thus permitting the carrier member 7 to be urged upwardly by the spring 29 toward its uppermost position; and when handle 36 is in its other extreme position shown in broken lines the actuating member 32 and the carrier member 7 are in their retracted positions as shown in broken lines. The handle 36 has a portion 38 that bears against a bracket 39 fixed to leg 4 of the conveyor frame, and shaped to cause the handle 36 to remain in either of the extreme positions to which it is manually moved.

The above parts are so arranged that when the carrier member 7 is in its uppermost position and no article is on the conveyor, the upper surface 17 of the top run 8 of the belt 10 is located slightly above the conveying surface defined by the tops of the wheels 5, as shown by line X in FIGURE 3, the uppermost portions of the carrier member 7, shoulders 13, preferably being well below such surface. When carrier member 7 is moved to its retracted position, when the handle 36 is in the position shown in broken lines, the upper surface 17 of the top run 8 of the belt is located a substantial distance below the conveying surface, as is shown in broken lines in FIGURE 3.

The parts are also so proportioned and the forces exerted by the springs 29 are such that when the carrier member 7 is in its uppermost position and upper surface 17 of the top run of belt 10 contacts the underside of the article P carried by the wheels 5 of the conveyor, the belt 10 and the member 7 carrying it are forced down slightly so that the upper run of the belt 10 frictionally engages the underside of the article P with sufficient force to move it along the conveyor.

This force need be only from about one and one-half to about three percent of the weight of the article being conveyed when the wheels 5 are of the conventional anti-friction type ordinarily used in conveyors of this general type. Therefore, when the belt 10 is a rubber V belt as indicated above, only a slight upward force need be exerted on the underside of the article being conveyed to move it along the conveyor, the wheels carrying most of the load. For example, when the co-efficient of sliding friction between the belt and article is about .75, the belt need exert an upward force of only about two pounds per lineal foot of belt to move a thirty pound article along a level conveyor. While the upward force exerted by the belt is not critical, it is desirable not to have an upward force that is much greater than necessary properly to drive the article along the conveyor. A greater upward force provides little if any additional benefit, while adding to the power requirements and belt wear.

In illustrated section A of the conveyor, retraction of the carrier member 7 tends pivotally to move the lefthand portion of the carrier member downwardly about the axis of a shaft 41 that rotatably engages and supports the right hand end of the carrier member and itself is journalled in journal members 42 carried by side rails of the conveyor. If section A of the conveyor is quite long, the entire carrier member can be retracted, or the carrier member may be formed in one or more segments which can be independently retracted if desired to halt the articles being conveyed.

FIGURE 4 shows alternative means for retracting the carrier member 7, comprising a flexible strand 43 connected at its upper end to nut 44 threaded on the end of a stud 26 that projects downwardly through the cross member 3 of the frame, and at its lower end to a foot pedal 45 pivotally mounted on the floor or suitable part of the frame. Such foot pedal can include suitable conventional means for holding it in retracted position until released.

In the illustrative apparatus, as shown in FIGURES 1 and 5, the belt 10 of section A also drives two belts 46 for inclined section B. This section comprises two slide rails 2 rigidly connected by cross members 3 and supported from the floor by being connected at their lower ends to side rails 2 of section A (FIGURE 5) and at their upper ends to side rails 2 of section C (FIGURE 6).

Inclined section B therefore has two drive units 6, each similar to drive units 6 of section A, to provide added driving force for conveying articles upwardly on the incline, and added braking force for controlling their movement down the incline. Each drive unit 6 comprises a tubular carrier member 7, similar to carrier member 7 of section A, that carries one of the belts 46. Each belt 46 is generally similar in cross section to belt 10 of driving member 6 of section A, but differs in that the surface providing the upper surface of the upper run is formed with closely spaced transverse ridges 47 (FIGURES 5 and 6) to increase frictional contact with the article conveyed. Each carrier member 7 of section B is resiliently supported and urged upwardly by being mounted on a plurality of downwardly extending studs 26 (FIGURE 5) that extend through cross members 3 of section B, such cross members having means as previously described to prevent tilting of the studs. A compression spring 29 surrounds each stud and bears on the lower surface of the carrier member and the upper surface of the cross member, and the bottom end of each stud 26 has lock nuts 31 similar to those shown in FIGURE 3 to prevent studs 26 from being forced upwardly out of the cross members by the springs.

In illustrated section B the carriers 7 are not retractable to disengage the upper surfaces of their belts from the lower surface of the article being conveyed, but are positioned so that the upper surfaces of the top runs of their belts are related to the wheels 5 carried by the side rails 2 as described above in connection with the belt of section A when its carrier member is in its uppermost position as shown in full lines in FIGURE 3. However, both carrier members 7 of section B may be provided with means, such as that previously described, to retract the carrier members so their belts disengage from the article being conveyed.

As shown in FIGURE 5, each belt 46 of each drive unit 6 of section B is moved so its upper run travels in the direction of the arrows by a pulley 51 around which the belt passes. Each pulley 51 is rigidly fixed to the shaft 41 on which the pulley 23 of drive unit 6 of section A is also rigidly fixed, to cause the belts 46 to be driven by the belt 10 of section A. Each belt 46 travels out of the lower end of its tubular carrier member 7 over an idler pulley 52 carried by bracket 24 fixed to the carrier member, and up and around the pulley 51 to the channel 14 in the upper surface of its tubular carrier member. The brackets 24 on the carrier members 7 of section B rotatably engage the shaft 41, each such bracket 24 having a journal block 42 in which an end of the shaft 41 is journalled. These bearing blocks are mounted for limited transverse movement on brackets 53 rigidly fixed to the side rails 2 of section A and B, as shown in FIGURE 5, to permit limited transverse movement of the shaft 41 as the ends of the carrier members move due to compression of their supporting springs 29.

FIGURE 6 shows in perspective the ends of the carrier members 7 and the belts 46 at the upper end of the inclined section B, as well as the drive end of the drive unit 6 for the horizontal section C; it also illustrates a preferred means for maintaining a desired tension in the belts of conveyor sections. Each carrier member 7 of inclined section B rigidly supports an end bracket 24 rotatably engaging a shaft 55 that is rotatably supported from the side rails 2 of sections B and C by means similar to that supporting shaft 41 in the structure of FIGURE 5.

A grooved pulley 56 is rigidly mounted on the shaft 55 in the bracket 24 at the end of each carrier member 7 of section B so that the top run of the belt 46 leaving the carrier member passes over the pulley 56 and downwardly to and under a lower roller pulley 57, then upwardly and over an idler pulley 25 journalled in bracket 24, and then into member 7. Idler pulley 57 is rotatably mounted on a bracket 58 having a downwardly extending stud 59 that extends through a cross member 61 and has lock nuts 62 on its end to provide an adjustable stop. Compression spring 63 surrounding stud 61 bears against the lock nuts 62 and the underside of the cross member 61 to urge the pulley downwardly. Each downwardly urged idler tension pulley 57 thus maintains a tension in its associated belt 46, determined by the force exerted by its spring 63.

Section C of the conveyor apparatus is similar to section A in that it comprises two side rails 2 rotatably carrying spaced conveyor wheels 5 and supported at the desired elevated location by legs 4. Section C includes a drive unit 6 that is essentially identical to the drive unit 6 of section A, comprising a tubular carrier member 7 (FIGURES 6 and 7) identical in cross section to carrier member 7 of section A and carrying a belt 65 identical in cross section to belt 10 of section A. Carrier member 7 of section C is mounted on cross members connected to the side rails of the frame, by means resiliently urging it upwardly similar to that shown in FIGURE 5 as supporting carrier member 7 of section A. If desired, carrier member 7 of section C can be retractable to cause the upper run of its belt 65 to disengage from an article carried by wheels 5.

As shown in FIGURE 6, belt 65 of section C is driven by a pulley 66 rigidly fixed to the shaft 55 that is rotated by the belts 46 of the drive units of section B. A desired tension may be maintained in belt 65 by causing the lower run of the belt to pass under a tension idler pulley 57 that is supported and urged downwardly by means similar to that discussed previously in connection with the tension pulleys 57 of belts 45 of section B.

Sections C, D and E in combination illustrate how it is possible to make right angle or other angular turns in a generally horizontal plane by locating sections C and D at substantially 45°, and sections D and E at substantially 45° in a generally horizontal plane. FIGURES 7 and 8 illustrate the juncture between sections C and D which are disposed at approximately 45°; the parallel side rails 2 carrying rotatable wheels 5 of section C are joined at the desired angle to the parallel side rails 2 carrying wheels 5 of section D, there being a wide cross connector member 67 between the parallel rail members of both sections at the juncture, to which they are rigidly fixed. Cross member 67 also rotatably supports two grooved idler pulleys 68 and 69 which rotate about a common axis generally perpendicular to the conveyor plane passing defined by the tops of the wheels 5 and generally perpendicular to the surfaces 12 of the channels 14 of the tubular carrier members that carry the belt 65. As is shown in FIGURE 7, the upper run of the belt twists 90° as it passes around upper idler pulley 68 and then untwists to resume its normal position as it passes to the following tubular carrier member; the lower run of the belt twists 90° as it leaves one tubular carrier member to pass around the lower idler pulley and untwists to resume its normal position as it travels to the other tubular carrier member.

Furthermore, the width of the belt and the width of at least the upper idler pulley 68 are so related that, as shown in FIGURE 8, as the upper run of the belt travels around upper idler pulley 68 its top edge projects above the top edge of the idler pulley which also is designed and mounted so that all top portions of the pulley and its mounting means lie substantially below the upper edge of the top run of the belt passing over the pulley. Therefore, the desired change in belt direction is achieved while insuring a positive frictional engagement of the top run of the belt with the article being conveyed as the article travels between sections C and D.

The juncture between section D and section E is identical and requires no further description.

Preferably a curved guard rail 71 (FIGURES 1 and 7) is rigidly mounted adjacent the rails 2 on the outside of the turn to aid in causing the articles to make the 90° turn.

In the switch section shown in FIGURES 9 and 10, section E of the conveyor is generally similar in construction to sections A, C and D in that it comprises two stationary side rails 2 carrying freely rotatable wheels 5 positioned as indicated in connection with the previously described sections, and a drive unit 6 resiliently mounted on cross members 3 between rails 2. This drive unit is essentially similar to the drive unit described previously in connection with sections A and C in that it comprises a tubular carrier member 7 of a cross section identical to that previously described. The channel-shaped upper portion of the member 7 carries the top run of the belt 65, the lower run of which returns through the tubular member, this belt being the same belt that travels through sections C and D. This tubular carrier member is mounted on cross members 3 and resiliently urged upward by means like that previously described. If desired, means may be provided for retracting this carrier member 7, such as those described in connection with section A. The belt 65 of section E travels from upper channel 14 to the inner channel of carrier member 7 over an idler pulley 71 mounted on a shaft 72 that is rotatably carried by the side rails 2 of section E and rotatably engaged by the bracket 24 fixed to the end of tubular carrier member 7. This pulley thus carries the belt in close vicinity to the switching sections F' and F".

Section F' comprises a stationary portion 73 and a movable portion 74 pivotally connected thereto. Stationary portion 73 includes fixed parallel longitudinally extending side rails 2 connected rigidly together by cross members 3 and carrying spaced article-supporting rollers 5. Movable portion 74 comprises spaced parallel side rails 75 and 76 pivotally connected by pins 77 to the side rails 2 of the stationary section.

Side rail 75 of the movable portion is shorter than side rail 76 to clear the corresponding rail of section F" while side rail 76 is long enough to approach closely the adjacent side rail of section E. Side rails 75 and 76 are connected together by cross members 78 and 79 to provide a rigid, pivotally movable structure. The end cross member 79, which preferably is angled as shown so that it extends close to the free ends of the rails 75 and 76 while clearing the other switch section F", is connected to a member 81 for moving the pivoted switch portion 74 to an uppermost position in which its rollers can carry the article being conveyed, and to a lower position shown by broken lines in FIGURE 10 in which switch section F' is inoperative to convey an article. Member 81 may be part of conventional manually or power actuated means.

The drive unit 82 for switch section F' (FIGURE 9) comprises a tubular carrier member 7 identical in cross section to the tubular carrier members previously described. One end of this tubular carrier member 7 projects close to the end of the drive unit of section E and carries a bracket 83 rotatably supporting an idler pulley 84. Tubular member 7 carries a belt 85 so the upper belt run passes over the channel-shaped upper portion of the carrier member and the lower belt run passes through the carrier member. The belt is driven by suitable means, not shown, and pulley 84 serves to carry the belt between its upper and lower runs.

The tubular member 7 is carried by the stationary portion 73 and the movable portion 74 so that the end of tubular carrier member 7 adjacent section E can move up and down with the unpivoted end of the movable portion 76. For this purpose, the carrier member 7 is mounted on the end cross member 79 of the movable portion 74 and on suitably located cross members 3 of the stationary section, by resilient means such as that shown in FIGURE 5. When the movable portion 74 of the switch is moved down to its inoperative position the drive unit 82 is carried with it to a location where the top run of its belt cannot engage an article being conveyed to the switch, while when the movable switch portion is in its uppermost position the carrier member 7 of unit 82 is also in its uppermost position and the top run of the belt carried therefore can engage an article traveling through the switch. Movable switch portion 74 also has rigidly fixed thereto an extension member 86 carrying additional wheels 5 that aid in supporting the conveyed article when the movable conveyor portion 74 is carrying the article.

Conveyor switch section F" is similar to switch section F' except for changes necessitated by the fact that conveyor section F" extends in a different direction. Therefore, conveyor section F" also includes a stationary portion 73' and a movable portion 74' pivotally connected thereto. This movable section has rails 75' and 76' of different lengths, carrying wheels 5 projecting above the rails to carry the load when the section is in its raised position, cross members 78' and 79' to form a rigid structure with the side rails, and means 81' attached to the end cross member 79' for raising and lowering the unpivoted end of movable portion 74'. It also includes a drive unit 82' identical with and mounted identically to drive unit 82 of the switch section F', comprising a tubular carrier member 7' slidably supporting a powered belt. Movable section 73' also rigidly supports an extension 86' carrying wheels 5' to aid in supporting the article conveyed through the switch when movable portion 73' is in its load-carrying position. Extension members 86 and 86' of the movable portions of sections F and F' are constructed to clear the drive units and other parts of the other switch sections, as is apparent from FIGURE 10.

The belts 85 and 85' of the sections F' and F" are driven by suitable means, such as any one of those previously described.

To switch an article from section E to section F', the movable member 74 of section F' is raised to its load-carrying position shown in full lines in FIGURE 10 and the movable member 74' of section F" is lowered to its inactive position shown in broken lines in FIGURE 10. The belt 65 of drive unit 6 of section E and the belt 85 of drive unit 82 of section F' are rotated so their upper runs travel in the directions indicated by the arrows in FIGURE 9. Of course, the belts could be moved so their top runs move in the opposite direction, to cause an article traveling on section F' to be switched onto section E.

By lowering movable portion 74 of section F' to the inactive position shown in broken lines in FIGURE 10 and raising the movable section of section F" to the upper position shown in full lines in FIGURE 10, and by moving the belts 65 and 85' in the proper directions, it is possible to cause an article traveling on section E toward section F" to switch onto section F"; and conversely by reversing the direction of the belts it is possible to cause an article traveling on section F" to switch to section E.

If desired, suitable curved guard rails, not shown, may be provided to assist the articles in traveling in the desired directions.

It is obvious that in the illustrated embodiment, articles can be moved down inclined section B rather than up as previously described; that a drive unit such as shown in FIGURE 5 need not necessarily be employed in connection with horizontal and inclined conveyor sections but may be employed with two horizontal or two inclined sections, and that power may be transmitted by the belts of the double drive units to the belt of the single drive unit. It is further apparent that the tensioning apparatus shown in FIGURE 6 need not be employed in connection with the transmission of power from one set of belts to another, but may be employed in systems in which all pulleys of the tensioning apparatus are idler pulleys; and that such tensioning apparatus need not be employed in connection with a combination of horizontal and inclined sections, but may be employed in connection with two inclined or two horizontal sections. It is further apparent that more than one drive unit comprising the tubular member and a belt may be employed in horizontal sections of the conveyor, and that only one drive unit, or more than two drive units, may be employed on inclined sections.

Furthermore, while for convenience the invention has been described in connection with conveyor sections employing freely rotatable wheels, the invention is also applicable to conveyors in which the wheels are replaced by elongated rollers which carry the load, between or otherwise adjacent which rollers there may be one or more drive units of the character illustrated.

These and other modifications of the illustrated embodiment will be apparent to those skilled in the art. It is intended that the patent shall cover, by suitable expression in the appended claims, whatever features of patentable novelty reside in the invention.

I claim:

1. A conveyor comprising a frame; article-conveying rollers rotatably mounted on said frame to carry an article moving along said conveyor; driving means adjacent said rollers comprising a carrier member having a tubular wall the upper wall portion of which defines an upwardly-open external channel having a continuous longitudinally-extending external upwardly-facing belt-supporting surface bordered by continuous longitudinally-extending shoulders for guiding a belt run longitudinally on said carrier member in said external channel, the lower wall portion of said carrier member defining an internal upwardly-facing open channel below said external upwardly-facing belt-supporting surface, and a narrow, thick, endless belt supported by said carrier member with its upper run slidably carried by said external channel of said carrier member with the upper portion of said upper belt run projecting above said shoulders and guided longitudinally of said carrier member solely by sliding engagement of said belt run with said external channel and with its lower run passing through said carrier member and slidably carried in guided relation in said internal channel; and means for supporting said carrier member in relation to said rollers so said upper run of said belt engages an article carried by said rollers to move said article along said conveyor in the direction of movement of said upper belt run.

2. The article conveyor of claim 1 in which said driving means comprises two spaced parallel belts.

3. The article conveyor of claim 1 comprising means for maintaining a predetermined tension in the belt.

4. A conveyor comprising a frame; article-conveying rollers rotatably mounted on said frame to define a conveying surface by their upper portions; driving means adjacent said rollers comprising a carrier member having a tubular wall the upper wall portion of which defines an upwardly-open external channel having a continuous longitudinally-extending external upwardly-facing belt-supporting surface bordered by continuous longitudinally-extending shoulders for guiding a belt run longitudinally on said carrier member in said external channel, the lower wall portion of said carrier member defining an internal upwardly-facing open channel below said external upwardly-facing belt-supporting surface, and a narrow, thick, endless belt supported by said carrier member with its upper run slidably carried by said external channel of said carrier member with the upper portion of said upper belt run projecting above said shoulders and guided longitudinally of said carrier member solely by sliding engagement of said belt run with said external channel and with its lower run passing through said carrier member and slidably carried in guided relation in said internal channel; and means for urging said carrier member upwardly so the upper run of the belt carried thereby normally projects above said conveying surface, said means permitting said carrier member to be moved downwardly by engagement of the upper run of said belt with an article carried by said rollers to cause said article to be moved along said conveyor in the direction of movement of said upper belt run.

5. The conveyor of claim 4 in which said means for urging said carrier member upwardly is resilient means.

6. The conveyor of claim 4 comprising means for drawing said carrier member away from an article carried by said rollers to disengage said upper run of said belt from an article carried by the rollers.

7. The conveyor of claim 4 comprising means for positively drawing said carrier member downwardly sufficiently to move the upper run of said belt below said conveying surface.

8. A conveyor comprising a frame; article-conveying rollers rotatably mounted on said frame to define a conveying surface by their upper portions; driving means between said rollers comprising a carrier member having a tubular wall the upper wall portion of which defines an upwardly-open external channel having a continuous longitudinally-extending external upwardly-facing belt-supporting surface bordered by continuous longitudinally-extending shoulders for guiding a belt run longitudinally on said carrier member in said external channel, the lower wall portion of said carrier member defining an internal upwardly-facing open channel below said external upwardly-facing belt-supporting surface, and a narrow, thick, endless belt supported by said carrier member with its upper run slidably carried by said external channel of said carrier member with the upper portion of said upper belt run projecting above said shoulders and guided longitudinally of said carrier member solely by sliding engagement of said belt run with said external channel and with its lower run passing through said carrier member and slidably carried in guided relation in said internal channel; and means for supporting said carrier member in relation to said rollers so said carrier member is urged upwardly so the upper run of the belt carried thereby normally projects above said conveying surface, said means permitting said carrier member to be moved downwardly by engagement of the upper run of said belt with an article carried by said rollers to cause said article to be moved along said conveyor in the direction of movement of said upper belt run.

9. The conveyor of claim 8 in which said means urging said carrier member upwardly is resilient means.

10. A conveyor comprising a frame; article-conveying rollers rotatably mounted on said frame to define a conveying surface with their upper portions; driving means between said rollers comprising a carrier member having a tubular wall the upper wall portion of which defines an upwardly-open external channel having a continuous longitudinally-extending external upwardly-facing belt-supporting surface bordered by continuous longitudinally-extending shoulders for guiding a belt run longitudinally on said carrier member in said external channel, the lower wall portion of said carrier member defining an internal upwardly-facing open channel below said externally-upwardly-facing belt-supporting surface, and a narrow, thick, endless belt supported by said carrier member with its upper run slidably carried by said external channel of said carrier member with the upper portion of said upper belt run projecting above said shoulders and guided longitudinally of said carrier member solely by sliding engagement of said belt run with said external channel and with its lower run passing through said carrier member and slidably carried in guided relation in said internal channel; and means for supporting said carrier member and for moving it from a position in which the upper run of the belt carried thereby projects above said conveying surface to a position in which the upper run of said belt is below said conveying surface.

References Cited by the Examiner

UNITED STATES PATENTS

| | | | |
|---|---|---|---|
| 1,209,021 | 12/1916 | Phillips | 198—82 |
| 1,598,099 | 8/1926 | Murray | 198—130 |
| 1,856,733 | 5/1932 | Shepherd | 198—198 |
| 1,998,065 | 4/1935 | Anderson | 193—36 |
| 2,455,175 | 11/1948 | Hohl | 198—190 |
| 2,493,479 | 1/1950 | Eggleston | 198—127 |
| 2,523,829 | 9/1950 | Hubbell | 198—204 |
| 2,613,790 | 10/1952 | Schottelkotte | 193—36 |
| 2,846,049 | 8/1958 | Carlson | 198—130 |
| 2,895,593 | 7/1959 | McKnight | 198—160 |
| 3,034,673 | 5/1962 | Sweezey | 198—160 |

HUGO O. SCHULZ, *Primary Examiner.*

ERNEST A. FALLER, RICHARD E. AEGERTER, SAMUEL F. COLEMAN, *Examiners.*